US008504479B2

(12) United States Patent
Bader et al.

(10) Patent No.: US 8,504,479 B2
(45) Date of Patent: Aug. 6, 2013

(54) KEY INTERFACE FOR SECURE OBJECT MANIPULATION

(75) Inventors: James E. Bader, Somerset, NJ (US); Jack R. Waters, II, Morrisville, NC (US); Eric R. Beaubien, Fort Wayne, IN (US)

(73) Assignee: Conexant Systems, Inc., Newport Beach, CA (US)

( * ) Notice: Subject to any disclaimer, the term of this patent is extended or adjusted under 35 U.S.C. 154(b) by 2769 days.

(21) Appl. No.: 10/230,054

(22) Filed: Aug. 29, 2002

(65) Prior Publication Data

US 2003/0084286 A1  May 1, 2003

Related U.S. Application Data

(60) Provisional application No. 60/315,313, filed on Aug. 29, 2001.

(51) Int. Cl.
 *G06F 17/00* (2006.01)
(52) U.S. Cl.
 USPC ............................................. 705/50; 380/255
(58) Field of Classification Search
 USPC ....................................................... 705/50–80
 See application file for complete search history.

(56) References Cited

U.S. PATENT DOCUMENTS

| | | | | |
|---|---|---|---|---|
| 4,688,169 A | * | 8/1987 | Joshi | 726/29 |
| 5,375,240 A | * | 12/1994 | Grundy | 726/28 |
| 5,450,489 A | * | 9/1995 | Ostrover et al. | 705/51 |
| 5,563,946 A | * | 10/1996 | Cooper et al. | 705/56 |
| 5,754,649 A | * | 5/1998 | Ryan et al. | 380/203 |
| 5,758,068 A | * | 5/1998 | Brandt et al. | 726/27 |
| 5,835,911 A | | 11/1998 | Nakagawa et al. | |
| 5,933,497 A | * | 8/1999 | Beetcher et al. | 705/59 |
| 5,991,399 A | * | 11/1999 | Graunke et al. | 380/279 |
| 6,000,032 A | | 12/1999 | Millard | |
| 6,009,401 A | * | 12/1999 | Horstmann | 705/1 |
| 6,009,525 A | * | 12/1999 | Horstmann | 726/22 |
| 6,028,936 A | * | 2/2000 | Hillis | 713/168 |
| 6,188,995 B1 | | 2/2001 | Garst et al. | |
| 6,195,432 B1 | | 2/2001 | Takahashi et al. | |

(Continued)

OTHER PUBLICATIONS

International Search Report dated Feb. 10, 2004 for Application No. PCT/US02/27452.

(Continued)

*Primary Examiner* — Calvin L Hewitt, II
*Assistant Examiner* — John M Winter
(74) *Attorney, Agent, or Firm* — Jackson Walker L.L.P.; Christopher J. Rourk

(57) ABSTRACT

A method and system for controlling access to various tiers of functionality of core software are provided. A software developer/vendor can develop a single version of software having one or more limited-access functionalities and provide the single version of the software to various types of customers. Each customer, using the single version of the core software, may develop additional software that utilizes one or more functionalities of the core software as authorized by the software developer/vendor. Access to a certain functionality or set of functionalities by the customer developed software is obtained by adapting the customer developed software to submit a key, provided by the software developer/vendor, to the core software through, for example, an application programming interface (API) of the core software. The core software is adapted to verify the provided key and, if the provided key is correct, allow the customer developed software access to the corresponding one or more functionalities of the core software.

29 Claims, 3 Drawing Sheets

U.S. PATENT DOCUMENTS

| | | |
|---|---|---|
| 6,332,025 B2 | 12/2001 | Takahashi et al. |
| 6,343,280 B2 | 1/2002 | Clark |
| 6,378,069 B1 | 4/2002 | Sandler et al. |
| 6,516,227 B1* | 2/2003 | Meadows et al. ............... 607/46 |
| 2001/0010046 A1* | 7/2001 | Muyres et al. .................. 705/52 |
| 2001/0042016 A1* | 11/2001 | Muyres et al. .................. 705/14 |
| 2001/0056405 A1* | 12/2001 | Muyres et al. .................. 705/52 |
| 2002/0002488 A1* | 1/2002 | Muyres et al. .................. 705/14 |
| 2002/0004744 A1* | 1/2002 | Muyres et al. .................. 705/14 |
| 2002/0111912 A1* | 8/2002 | Hunter et al. ................... 705/52 |

OTHER PUBLICATIONS

Minutes of the Oral Proceedings before the Examining Division for European Application No. 02797773.5 dated Dec. 5, 2008.

Decision to Refuse European Application No. 02797773.5 dated Dec. 5, 2008.

\* cited by examiner

KEY INTERFACE FOR SECURE OBJECT MANIPULATION

CROSS REFERENCE TO RELATED APPLICATIONS

Priority is claimed based on U.S. Provisional Application No. 60/315,313 entitled "Key Interface for Secure Object Manipulation" filed Aug. 29, 2001.

FIELD OF THE INVENTION

The invention relates generally to the field of selectively providing secure party access to code, such as functional modules and the like, such as via application programming interfaces (APIs).

BACKGROUND OF THE INVENTION

Developers and/or vendors of software often make updates, enhancements, additions, modifications, etc., available to customers, such as by transmission over a network, delivery by mail or courier, and the like. The software made available to customers or potential customers often is contingent upon payment or upon some earlier payment or agreement, such as a purchase and license of some software application. The software made available may include updates, enhancements, additions, and the like, of the software or may be additional functional modules or the like to supplement the performance or capabilities of the core software (herein collectively referred to as "modifications" of the core software). Further, it is often desirable to provide customers the software in binary form as opposed to source code, when the source code is of a proprietary nature. This allows a customer, through a provided application programming interface (API), to develop additional software and functionality using the provided binary code as a basis without subjecting the underlying operation of the software to scrutiny by the customer as would be possible using the source code.

In many cases, different versions of a software release may include different subsets, or "tiers", of functionality to accommodate a variety of customers. To illustrate, a software release may have a basic version and an enhanced version that includes additional functionality in excess of the basic version. A typical approach to restrict access to the tiers of functionality is to provide separate versions of the binary code to different customers, each version implementing only the tiers of functionality for which the designated customer is authorized to access. Accordingly, there may be multiple and varied classes of licenses and licensees maintained by a software developer/vendor for any given software product. Offering multiple variants of code is expensive both in terms of having to test and support multiple variants as well as providing difficulties for customers wanting to add new tiers of functionality in that they are required to integrate a new binary code deliverable in order to change their tiers of functionality. As a result, the developer/vendor often must expend considerable resources developing, verifying, compiling, maintaining, storing, and/or servicing the often numerous versions of the core software.

Accordingly, an improved system and a method for restricting access to tiers of functionality in software would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, greater system performance, flexibility, cost savings, etc.

The present invention provides a method and system that enable software providers or vendors to distribute upgrades, modifications, enhancements, and the like, as well as complete software packages in a secure, controlled manner. The invention enables a software provider to condition the access of its customers or potential customers to the provider's software based on keyed verification via APIs or browsers and other graphical user interfaces (GUIs).

Providers often desire to provide customers with code in binary form as opposed to source code when the source code is of a proprietary nature. One desired benefit of this is to enable the provider's customers, through a given API, to develop additional software and functionality using the provided binary code as a basis, this additional software shall be referred to as a "Customer Added Service Tier". Likewise, a provider may establish tiers of functionality in the provided binary code and condition access to each tier separately such as through payment or in accordance with terms of an agreement. Such provider supplied functional tiers shall be referred to as "Binary Service Tiers." With the Customer Added Service Tiers, customers add their own custom tiers to the binary code based on whether or not they have purchased the right to make such extensions. However, with Binary Service Tiers, the provider supplies its customers with access to additional built-in functionality based on, for example, the customer purchasing access to one or more tiers of functionality. Furthermore, the Customer Added Service Tiers may implement the functionality provided by the Binary Service Tiers.

It is often desirable to prevent access to each tier of functionality (both Customer Added Service Tiers and Binary Service Tiers) by customers who have not paid for that tier of functionality or are otherwise unauthorized. The provider uses Binary Service Tiers to offer separate versions of the same core software, each version implementing only the functional tiers for which that particular customer is to have access. In this manner, the provider can use Binary Service Tiers to restrict customers' ability to create Customer Added Service Tiers, thereby selectively allowing customer extensions or disallow customer extensions.

The processes and methods of the present invention as described herein provide a secure method for controlling access to tiers of functionality. This may be accomplished via a character string and key pair. As part of the API for tier manipulation (contained within the binary code), the customer supplies a tier identifier and a key. The binary code will run a verification process on the tier identifier, generating a verification key. If the customer provided key and the verification key do not match, then the operation is aborted.

The process, program or module for controlling access preferably is contained only in the binary code, thereby preventing the customer from developing new tiers and calculating the associated key. Customers can be provided keys for tiers of functionality for which they have paid or are otherwise authorized to obtain. Although a tier of functionality may be added by a customer, using that new tier can be restricted if the customer has not paid for that capability or is otherwise prohibited.

In one embodiment, a method for controlling access to a certain functionality of a first software is provided. The method comprises the steps of receiving, at the first software, a key associated with at least one desired functionality of the first software, wherein the key is provided by a second software, verifying the key, and allowing the second software to access the at least one desired functionality when the key is verified.

In another embodiment, a system for controlling access to at least one functionality of a first software is provided. The system comprises a key verification module being adapted to verify a key provided by a second software, the key being associated with at least one desired functionality of the first software to be used by the second software and a tier functionality application programming interface (API) being adapted to interface with the second software to provide the at least one desired functionality to the second software. The system further comprises a tier access control module operably connected to the key verification module and the tier functionality API and being adapted to direct the tier functionality API to allow the second software to access the at least one desired functionality of the first software when the key is verified by the key verification module.

In yet another embodiment, a computer readable medium for controlling access to at least one functionality of a first software is provided. The computer readable medium comprises a set of instructions being adapted to manipulate a processor to receive, from a second software, a key associated with at least one desired functionality of the first software. The set of instructions are further adapted to manipulate the processor to verify the key and allow the second software to access the at least one desired functionality of the first software when the key is verified.

In a network gateway of a distributed communications network, a system for controlling access to at least one functionality of a first software of the network gateway is provided in accordance with an additional embodiment. The system comprises a key verification module being adapted to verify a key provided by a second software, the key being associated with at least one desired functionality of the first software to be used by the second software, and a tier functionality application programming interface (API) being adapted to interface with the second software to provide the at least one desired functionality of the first software to the second software. The system further comprises a tier access control module operably connected to the key verification module and the tier functionality API and being adapted to direct the tier functionality API to allow the second software to access the at least one desired functionality when the key is verified by the key verification module.

In another embodiment, an operating system is provided. The operating system comprises a key verification module being adapted to verify a key provided by software external to the operating system, the key being associated with at least one desired functionality of the operating system to be used by the external software, and a tier functionality application programming interface (API) being adapted to interface with the external software to provide the at least one desired functionality of the operating system to the external software. The operating system further comprises a tier access control module operably connected to the key verification module and the tier functionality API and being adapted to direct the tier functionality API to allow the external software to access the at least one desired functionality of the operating system when the key is verified by the key verification module.

In yet another embodiment, a network protocol stack is provided. The network protocol stack comprises a key verification module being adapted to verify a key provided by a component external to the network protocol stack, the key being associated with at least one desired functionality of the network protocol stack to be used by the external component, and a tier functionality application programming interface (API) being adapted to interface with the external component to provide the at least one desired functionality of the network protocol stack to the external component. The network protocol stack further comprises a tier access control module operably connected to the key verification module and the tier functionality API and being adapted to direct the tier functionality API to allow the external component to access the at least one desired functionality of the network protocol stack when the key is verified by the key verification module.

One object of the present invention is to provide a secure method for controlling access to a individual or groups of tiers of functionality that may be used by a customer to develop desired functionality in or as an adjunct to existing base software.

Another object of the invention is to control what tiers of functionality a customer is able to access using provider supplied binary code.

Another object of the present invention is to make it easier for providers to distribute software to their customers in a secure, controlled manner.

Yet another object of the present invention is to allow the customers to access binary code of a provider in a keyed fashion to create customer added service tiers based on accessible binary service tiers.

The present invention may be implemented in graphical user interface (GUI) development kits, such as included in embedded web servers, and may be incorporated into products that include a web-based interface. The present invention may be included in a software package designed to enable a user to create a web-based interface. As such, it might be included in an integrated design employing software in silicon technology, such as products using ISOS™ Software as offered by Globespan Virata Incorporated of Red Bank, N.J., or as an auxiliary part of any software system.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DETAILED DESCRIPTION OF THE INVENTION

The following description is intended to convey a thorough understanding of the invention by providing a number of specific embodiments and details involving selectively enabling access via APIs to binary code and its tiers of functionality, such as through the use of keys to gain access to certain functionality. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs. The present invention may be used in conjunction with a wide variety of APIs and programming languages, including, but not limited to, Java, C, and C++.

Figure 1:
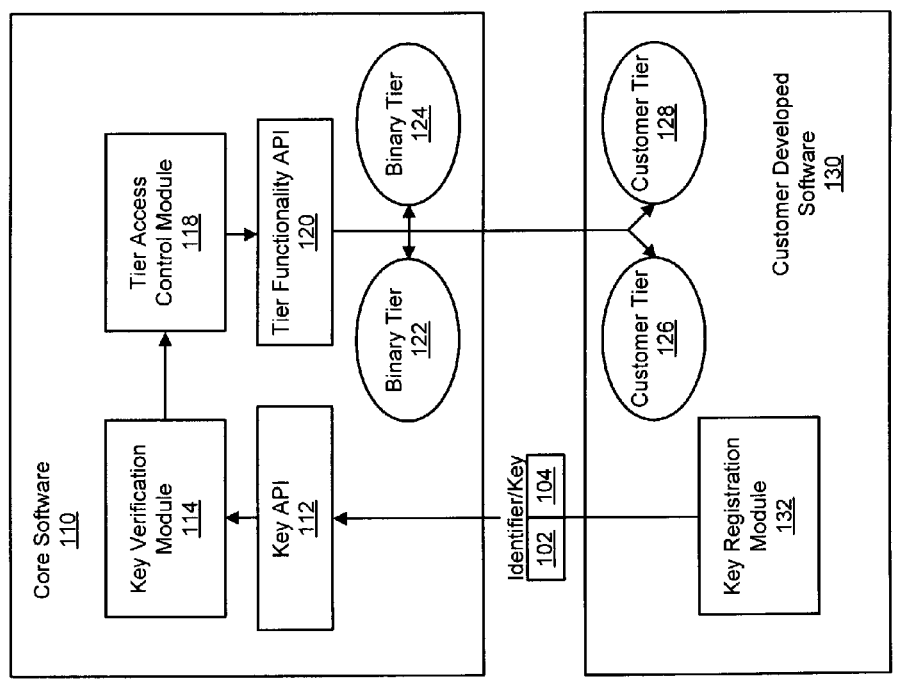
FIG. 1 is a flow diagram illustrating an exemplary method for restricting access to different functionalities of a single build of binary object code in accordance with at least one embodiment of the present invention.

Referring now to FIG. 1, a flow diagram illustrating an exemplary process to control access to various functionalities of a single build of binary code is illustrated. In the illustrated exemplary embodiment, a customer develops software (customer developed software 130) to implement a subset of the functionality of core software 110 provided by a software developer/vendor. The core software 110 may be provided to the customer as binary code or other preferred format, thereby limiting the ability of the customer to discern the proprietary processes performed by the core software 110. The terms "core software" and "customer developed software" are used in the following to distinguish between two sets of software, the "core software" including software having one or more limited-access tiers of functionality and the "customer developed software" including software that utilizes one or more of these tiers. To illustrate, the core software 110 could include an operating system (OS) and the customer developed software could include a software application external to the OS that is adapted to utilize one or more functionalities of the OS to perform one or more tasks.

As discussed above, tiers of functionality can include Customer Added Service Tiers (i.e., functionality developed and added by a customer as part of the customer developed software 130) and Binary Service Tiers (i.e., functional tiers developed in the original core software 110). In the example of FIG. 1, the core software 110 provides two Binary Service Tiers: binary tier 122 and binary tier 124. Similarly, in this example, the customer developed software 130 includes two Customer Added Service Tiers: customer tier 126 and customer tier 128. Each tier of functionality includes a subset of the total functionality provided by core software 110 and/or customer developed software 130.

The subset of functionality associated with each tier can be mutually exclusive of the functionality of other tiers; the functionality of tiers may overlap; the functionality of one tier can be a subset of the functionality of another tier; or a combination thereof. For example, assume that the core software 110 has twenty functions that the customer developed software 130 can access through one or more APIs. In this case, the binary tier 122 could include, for example, ten of the functions and the binary tier 124 could include the remaining ten functions. Alternatively, the binary tier 122 could include, for example, 12 functions and the binary tier 124 could include the remaining eight functions in addition to six of the functions also available through the binary tier 122. Furthermore, the binary tier 124 could include all twenty functions while the binary tier 122 could include only five of the functions, thereby making the binary tier 122 a subset of the binary tier 124.

By associating various subsets of the overall functionality in different functional tiers, the developer/vendor of the core software 110 can provide various subsets of functionality to different customers. In one embodiment, key verification is utilized to limit access to a functional tier to only those customers that are authorized, such as by purchase or by license agreement, to access the corresponding functional tier. FIG. 1 illustrates an exemplary process of accessing the functionality provided by tiers 122, 124, 126, and/or 128, described in more detail in the following paragraphs.

Initially, the developer/provider of the core software 110 provides one or more keys (key 104, for example) to the customer for the tiers of functionality purchased by the customer or otherwise assigned to the customer. Using the access to the tiers of functionality afforded by the corresponding keys, the customer then can develop software (customer developed software 130) to interface with the public APIs provided by the core software 110.

Accordingly, in at least one embodiment, the customer developed software 130 includes a key registration module 132 adapted to provide an identifier 102 associated with a desired functional tier and the corresponding key 104 to the core software 110 using a key API 112. The identifier 102, in one embodiment, includes a reference to the tier of functionality the customer is attempting to access, such as a name, number, or other identifier associated with the desired tier.

To illustrate, the binary tier 122 could include a functional tier identified as "basic I/O" that encompasses a basic set of input/output (I/O) related functions and the binary tier 124 could include a functional tier identified as "enhanced I/O" that includes the basic set of I/O functions as well as additional I/O functions. In this case, the key registration module 132 could pass the character string "basic I/O" as the identifier 102 and the associated key 104 provided by the developer to the key API 112 in order to access the functionality provided by the binary tier 122 or the key registration module 132 could pass the character string "enhanced I/O" as the identifier 102 and the associated key 104 to access the functionality of the binary tier 124. The key 104 associated with a given functional tier can include any variety of representations of keys known to those skilled in the art, such as a string of characters, a string of numbers, a binary sequence, or a combination thereof. As discussed in greater detail below, the key 104 can be generated using a random number, generated from the identifier associated with the functional tier, or may be generated using other acceptable techniques.

In this example, the key API 112 provides the identifier/key to a key verification module 114, whereby the key verification module 114 performs a key verification process using the customer supplied identifier/key to verify that the supplied key matches the actual key associated with requested tier of functionality. In one embodiment, the key verification process includes generating a verification key based on a calculation performed on the provided identifier 102 and then comparing the verification key with the passed key 104 to determine if there is a match. In another embodiment, the key verification module 114 includes, for example, an array or table of verification keys associated with the different functional tiers. When an identifier 102 and key 104 are provided by the customer developed software 130, the key verification module 114, in this case, accesses the verification key from the array using the identifier 102 as the index. The verification key from the array is then compared to the provided key 104 to determine a match. In either case, if the provided key 104 and the generated key/stored key match, the key 104 is considered verified. Otherwise, the key 104 is considered unverified.

Since knowledge of the underlying key verification process may enable unauthorized access to the tiers of functionality provided by the core software 110, it may be desirable to prevent customers or other third parties from understanding the key verification process performed by the key verification module 114. Accordingly, in at least one embodiment, the key verification process used by the key verification module 114 is implemented entirely in the core software 110. The key verification module 114, in this case, appears as a "black box" to the customer, whereby an identifier 102 and/or key 104 are input by the customer developed software 130 and an indicator of the validity (i.e., verified or unverified) of the supplied key is output, without the customer having knowledge of the verification process performed.

In the event that the provided key 104 is successfully verified by the key verification module 114, the key verification module 114 then signals the tier access control module 118, which then enables access to the tier of functionality represented by the provided identifier 102 and verified key 104. In one embodiment, the tier access control module 118 is adapted to enable access to a functional tier by providing a signal to the tier functionality API 120. The signal indicates that the customer developed software 130 is authorized to implement the functionality of the approved tier once authorized access to the appropriate binary tier(s) is achieved.

The tier functionality API 120 may be implemented in a variety of ways. For example, in one embodiment, a different tier functionality API 120 is implemented for each functional tier. In this case, the tier access control module 118 can enable the customer developed software 130 to use the tier functionality API 120 of a given functional tier, for example, by changing the value of a variable accessible to both the tier functionality API 120 and the tier access control module 118 (e.g., changing the value of a variable "enabled" from "false" to "true"). In another embodiment, the core software 110 includes a number of tier functionality APIs 120, each API 120 may be associated with a subset of the functionality of a given tier. In this case, each tier of functionality is represented by a combination of one or more tier functionality APIs 120. The tier access control module 118 can enable access to a given tier of functionality by enabling each API 120 associated with the functionality of the given tier. In another embodiment, the tier functionality API 120 may be implemented to access the functionality of more than one functionality tier. In this case, the tier access control module 118 can enable access to a given tier of functionality by directing the API 120 to allow the customer developed software 130 access to a subset of the functions interfaced via the API 120, the subset of functions being representative of the functionality of the desired tier.

After the tier access control module 118 has directed the tier functionality API 120 to allow the customer developed software 130 access to the indicated functional tier, the customer developed software 130 then can exploit the permitted functionality of the core software 110 using the tier functionality API 120 as an interface between the customer developed software 130 and the core software 110.

As discussed above, the key verification module 114 is adapted to use one or more key verification processes to verify the key 104 provided by the key registration module 132 of the customer developed software 130. Any of a variety of key verification processes may be implemented. For example, in one embodiment, the developer/vendor of the core software 110 can generate keys using, for example, a random number generator and assign each random-number key to a different tier of functionality. In this case, the developer can provide the random-number key associated with a certain functional tier to a customer. The customer may then adapt the key registration module 132 of the customer developed software 130 to provide the random-number key (key 104) to the key API 112 in order to gain access to the corresponding functional tier. The key verification module 114 then compares the provided key to its version of the key to determine a match. However, it will be appreciated that a key verification process using stored keys may require an excessive amount of memory to store the core software 110, especially in the event that a relatively large number of functional tiers are implemented by the binary code.

In another embodiment, the key verification process is based on a key developed from a calculation or other manipulation performed using the provided identifier 102 associated with the desired functional tier. An exemplary key verification process using a provided identifier is illustrated in the following pseudocode function "CompareKey":

```
bool CompareKey (string Name, int ProvidedKey)
{
    int CalculatedKey = y1;      //initialize CalculatedKey
                                 // to arbitrary value y1
    int Index;
    int RNum[8] = { x0, x1, x2, x3, x4, x5, x6, x7 }
    for (i = 0; i<strlen(Name); i++ )
    {
        // Mask off 3 bits to get index into RNum
        Index = Name[i] & 0x07;
        CalculatedKey = Calculated Key +(Name[i]*RNum[Index]);
    }
    if (ProvidedKey == CalculatedKey) return True
    else return False;
} //End CompareKey
```

In the above function "CompareKey", the verification key (the integer "CalculatedKey") is generated using the identifier 102 (the character string "Name") provided by the key registration module 132 and an array "RNum" having eight random numbers x0-x7. The initial value of CalculatedKey is set to an arbitrary number y1. The resulting value of CalculatedKey is then compared with the value of the key 104 (the integer "ProvidedKey") provided by the key registration module 132. If the value of CalculatedKey is equal to the value of ProvidedKey (i.e., the provided key 104 matches the generated verification key), the function CompareKey returns the Boolean value "True", verifying that the provided key 104 matches the verification key and access to the corresponding functional tier therefore should be granted. Otherwise, the function CompareKey returns the Boolean value "False", indicating that the provided key 104 does not match the verification key and that access to the functional tier by the customer developed software 130 should be denied.

The key provided to a customer for gaining access to a certain tier of functionality can be generated using the same process and values for y1 and the array RNum used to generate the CalculatedKey value using the identifier 102 (the character string "Name") associated with the certain tier. Accordingly, rather than storing a separate verification key for each functional tier, the function CompareKey can be used to verify customer-provided keys for some or all of the functional tiers implemented by the core software 110. Although a number of exemplary key verification processes have been discussed, other key verification processes may be implemented without departing from the spirit or the scope of the present invention.

The present invention may be implemented in any of a variety of software environments wherein access to certain functionalities of a core software are limited based on the authorization obtained by a user/customer/developer of the core software. To illustrate, the exemplary key verification process and system described above may be implemented as part of an operating system (OS) of, for example, customer premises equipment (CPE) in a communications network, such as a DSL modem or optical network termination (ONT). The developer of the OS can generate one or more keys associated with one or more limited-access functionalities of the OS. Other developers desiring to design "external" software (i.e., software that is not part of the provided OS software) that expands upon the capabilities of the OS (e.g., by adding a graphical user interface or implementing expanded features of the CPE) can obtain the key(s) associated with the one or more desired limited-access functionalities to be used in the external software. The developer may then adapt its software to provide these one or more keys to the OS to gain access to the desired functionality or set of functionalities for use by the external software. Additional exemplary implementations of the system and method of FIG. 1 are illustrated below with reference to FIGS. 2 and 3.

Figure 2:
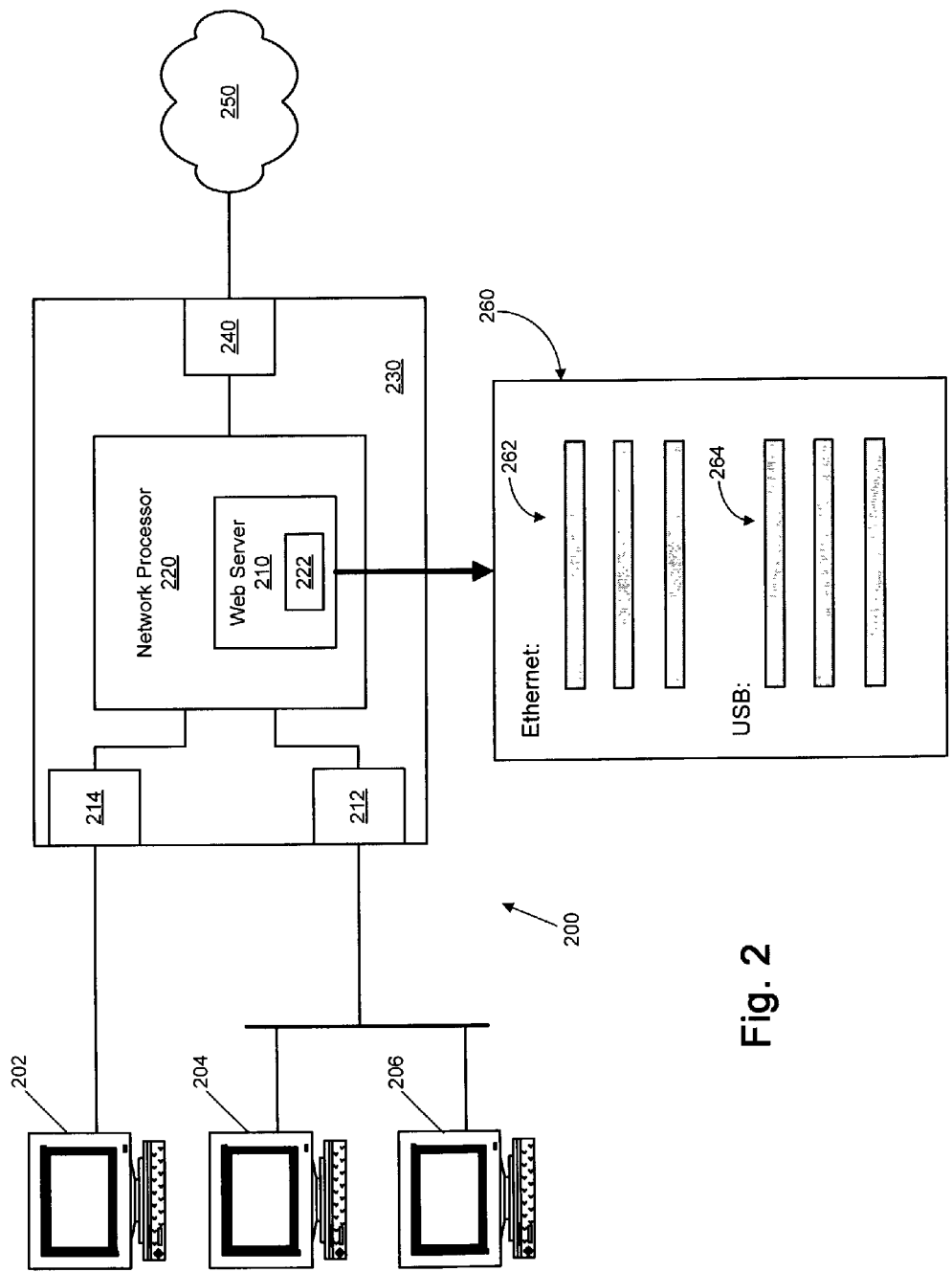
FIG. 2 is a schematic diagram illustrating a web server of a network gateway, the web server implementing the exemplary method of FIG. 1 in accordance with at least one embodiment of the present invention.

Referring now to FIG. 2, an exemplary distributed network 200 implementing restricted functionality access is illustrated in accordance with at least one embodiment of the present invention. The network 200 includes one or more network devices 202-206 connected to an external network 250 (e.g., a wide area network) via a network gateway 230. The network devices 202-206 can include any of a variety of user devices adapted to communicate via a communications network, such as a desktop computer, a laptop computer, a wireless personal digital assistant, a cell phone, and the like. The gateway 230 is adapted to facilitate communication between the network devices 202-206 and devices on the external network 250 and can include any of a variety of network gateway devices implemented to connect devices on one network to another network, such as a digital subscriber line (DSL) modem, a cable modem, a dial-up modem, a router, a switch, a hub, and the like. The gateway 230 can include a CPE device located at the end-user of the network, such as a DSL modem, or an intermediary device located between the end user and the corresponding device on the external network 250, such as a router.

The gateway 230 includes a network processor 220 (e.g., the HELIUM™ 200 network processor available from Globespan Virata Incorporated of Red Bank, N.J.) adapted to facilitate the transfer of data between the network interface 240 (e.g., a Utopia interface) connected to the external network 250 and the network interfaces 212, 214 connected to one or more of the network devices 202-206. The network processor 220 (or another processor of the gateway 230) is further adapted to support the execution of an embedded web server 210 (one embodiment of the core software 110 of FIG. 1).

The embedded web server 210, in one embodiment, is utilized to generate and provide one or more web pages 260, such as a hypertext markup language (HTML) page, an extensible markup language (XML) page, and the like, to an administrator or other user. The web page 260 includes information representing the status and/or operation of one or more of the components of the gateway 230 and may include one or more customer-configurable features, such as operation parameters/indicators, web page logos, and the like. For example, the web page 260 can include indicators of the status of the network processor 220, the local interfaces 212-214, the external interfaces 240, and the like. As such, the administrator or other user can use the web page 260 provided by the web server 210 to monitor the operation of the gateway 230, change various operational parameters, and the like.

As will be appreciated, the embedded web server 210 and the network processor 230 may be implemented in a variety of gateways 230 having different configurations. Therefore, the software developer/vendor of the embedded web server 210 typically desires to minimize the effort and expense to develop, maintain, verify, and provide different versions of the embedded web server 210 for different customers. Accordingly, the developer/vendor can implement the present invention to provide a core software product for the embedded web server 210 having the overall functionality to support the wide variety of possible gateway configurations while limiting the developers of the gateway (i.e., the customers of the embedded web server 210) to only those subsets/tiers of functionality to which the gateway developers are authorized to access, such authorization may result from a license agreement or payment to the embedded web server developer.

To illustrate, consider the following example. In this example, assume that the developer of the embedded web server 210 has incorporated two tiers of functionality, a "standard" tier and an "enhanced" tier. The standard tier, for instance, includes functional support for a single local interface (interface 212 in this example, such as an Ethernet interface) whereby the device driver (one embodiment of the customer developed software 130 of FIG. 1) of the interface 212 is allowed to register various classes with a class register 222 associated with the embedded web server 210, the classes being representative of various aspects of the operation of the interface 212. For example, one of the classes could include a "physical layer" class used to indicate the connection status of the physical layer of the interface. Furthermore, the standard tier of functionality allows the device driver for the interface 212 to write various class values to the class register 222, where the class values represent a status or other indicator of the corresponding aspect of the interface 212. The embedded web server 210 uses the classes and the class values in the class register 222 to generate the web page 260 indicating the operation/status of the various components of the gateway 230. For example, using information provided by the device driver of the interface 212, the web page 260 can generate an interface status section 262 of the web page 260 for displaying information regarding the interface 212.

While the use of a single local interface 212 may be sufficient for some implementations of the gateway 230, in other implementations gateway developers may desire to add an additional local interface 214, such as a universal serial bus (USB) interface, to the gateway 230 for use by the network device 202. Accordingly, in this example, the enhanced tier of functionality implemented by the embedded web server 210 includes functional support of a second local interface (interface 214). In a similar manner as the standard tier of functionality, the enhanced tier of functionality allows the device driver for the interface 214 to register various classes associated with the interface 214 to the class register 222 as well as write/update values associated with the registered classes. The embedded web server 210 then can use the information supplied by the device driver of the interface 214 to the class register 222 to generate an interface status section 264 for displaying information relating to the interface 214.

For any of a variety of reasons, the developer of the embedded web server 210 may desire to limit access to the enhanced tier of functionality to a select subset of customers. Accordingly, the web server developer can generate an identifier and a key for the enhanced tier of functionality and supply the identifier and/or key to each of the authorized customers. The authorized customer then can implement the key registry module 132 (FIG. 1) into the device driver (one example of the customer developed software 130, FIG. 1) for the local interface 214. The key registry module 132 of the device driver supplies the identifier and key to the key verification module 114 (FIG. 1) of the embedded web server 210 via a key API 112 (FIG. 1) implemented by the embedded web server 210. The key verification module 114, using one or more key verification processes described above, verifies the key and informs the tier access control module 118 (FIG. 1) to allow access if the key is verified. The tier access control module 118 then directs the tier functionality API 120 (FIG. 1) associated with the enhanced tier of functionality to allow access to the class register 222 by the device driver of the interface 214.

However, in the event that an unauthorized customer attempts to utilize the functionality of the enhanced tier by providing an incorrect key or no key, the key verification module 114 detects the incorrect/nonexistent key and indicates the unverified status of the key to the tier access control module 118. The tier access control module 118, noting the key was unverified, can either continue to operate in the default state whereby access to the enhanced tier of functionality is prohibited or the tier access control module 118 can go even further by directing the tier functionality API 120 to prohibit access to tiers of functionality that would be otherwise accessible.

After the device driver for the local interface 114 is allowed access to the class register 222, the device driver can register classes associated with the local interface 114 as well as update the values associated with the classes. Accordingly, when the embedded web server 210 generates the web page 260, the embedded web server 210 can use the classes and class values registered by the device driver for the interface 114 to generate the interface status section 264 for review by an administrator or other user.

By using core software (the embedded web server 210) having multiple tiers of functionality accessible by different classes of customers, the developer of the embedded web server 210 can provide the same software to each customer regardless of the access profile of the customer. However, those customers authorized to access the enhanced tier of functionality may adapt the device driver for the additional interface 114 to provide the key and identifier associated with the enhanced tier to the core software to gain access to the functionality of the enhanced tier. As a result, the developer of the embedded web server 210 has only one version of the software to maintain. Additionally, as discussed above, in one embodiment, the key associated with a functional tier is generated and verified based on a calculation performed on the identifier associated with the functional tier. In this case, it is unnecessary for the developer of the embedded web server 210 to maintain a list of keys supplied to customers.

Figure 3:
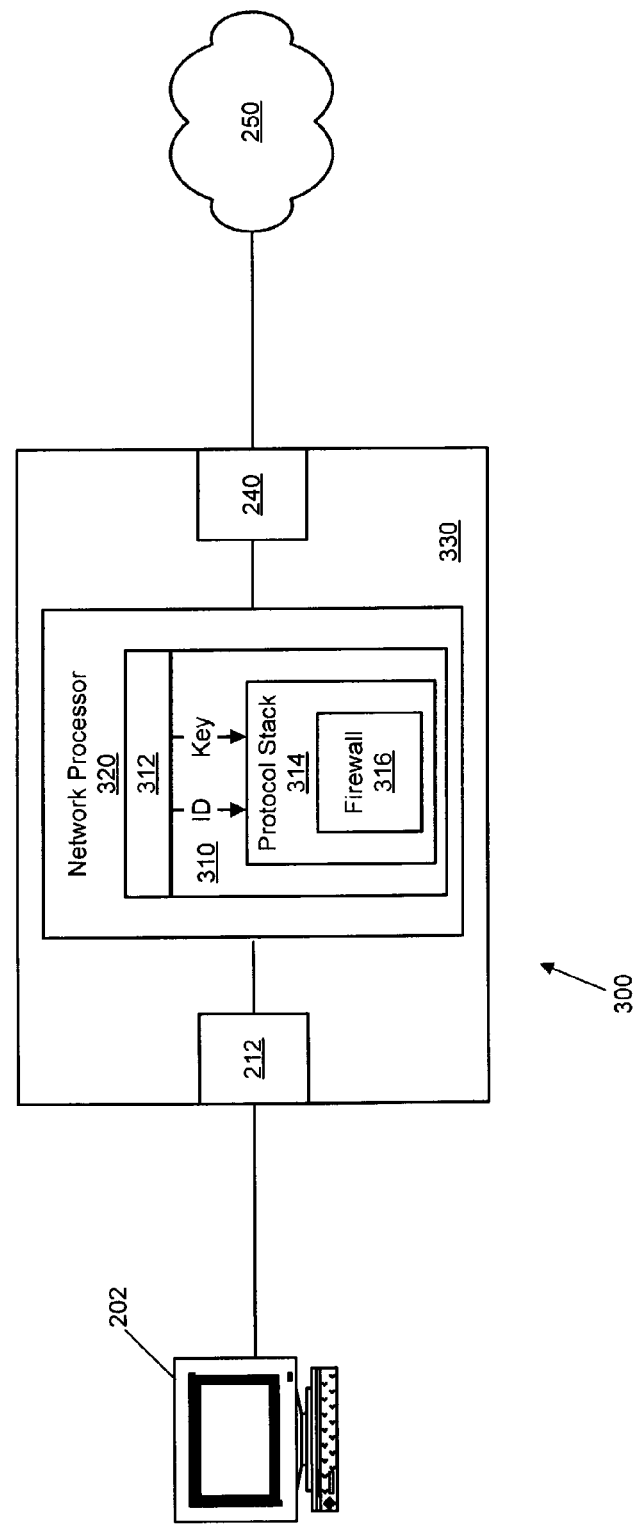
FIG. 3 is a schematic diagram illustrating a network protocol stack of a network gateway, the network protocol stack implementing the exemplary method of FIG. 1 in accordance with at least one embodiment of the present invention.

Referring now to FIG. 3, a network protocol stack implementing the exemplary method and system of FIG. 1 is illustrated in accordance with at least one embodiment of the present invention. In the illustrated example, the network protocol stack 314 is implemented as part of an operating system 310 of a network processor 320 of the network gateway 330, where the network gateway 330 is adapted to facilitate bidirectional communication between the network device 202 and an external network 250 via interfaces 212, 240. However, the network protocol stack 314 may be implemented in any of a variety of applications without departing from the spirit or the scope of the present invention.

The network protocol stack 314 can include one or a combination of network protocol stacks, such as Telecommunications Protocol/Internet Protocol (TCP/IP), Voice over IP (VoIP), Simple Network Time Protocol (SNTP), Utopia, and the like. In at least one embodiment, the network protocol stack 314 includes a standard tier of functionality available to a base set of customers, as well as one or more limited-access functionalities available to authorized customers. Accordingly, the developer can maintain a single version of the OS 310 while enabling different levels of functionality of the OS 310 for different customers.

After receiving a build of the OS 310 used by the network processor 320, an authorized customer can develop external software 312 to operate in conjunction with the OS 310 to implement the selected limited access functionalities of the network protocol stack 314. The OS 310 and external software 312 then can be loaded into the network processor 320 for use during operation of the network gateway 330.

To illustrate, the network protocol stack 314 could include a TCP/IP stack having the functionality of a typical TCP/IP stack in addition to a firewall functionality 316 for filtering packets between the external network 250 and the network device 202. Those customers who desire to use the firewall functionality 316 in addition to the base TCP/IP functionality can request a key/identifier pair from the developer of the OS 310. After receiving the key/identifier pair, an authorized customer can adapt their external software 312 to provide the key/ID pair to the key verification module 114 (FIG. 1) of the network protocol stack 314 to enable access to/operation of the firewall functionality 316. If the key is verified, the key verification module 114 directs the tier access control module 118 (FIG. 1) of the network protocol stack 314 to enable the firewall functionality 316 for use by the protocol stack 314 and/or the external software 312 via, for example, the tier functionality API 120 (FIG. 1). Alternatively, the firewall functionality 316 could be implemented as customer developed software utilizing the functionality of the network protocol stack 314, wherein the customer developed software is adapted to provide the key/ID pair to the network protocol stack 314 to gain access to the data stream (i.e., the desired functionality), which can then be filtered and/or otherwise processed to provide the firewall functionality 316.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A method for controlling access to a certain functionality of a first software stored on a computer, the first software comprising a plurality of functionalities, the method comprising the steps of:
   receiving, at the first software stored on the computer from a second software, a key associated with at least one functionality to be accessed within the first software, wherein the key is provided by the second software;
   verifying the key using the computer; and
   allowing, using the computer, the second software to access the at least one functionality to be accessed within the first software stored on the computer when the key is verified, the at least one functionality to be accessed within the first software stored on the computer including a customer-added service tier.

2. The method as in claim 1, further comprising the step of prohibiting the second software from accessing the at least one functionality to be accessed within the first software stored on the computer when the key is unverified.

3. The method as in claim 1, wherein the at least one functionality to be accessed within the first software stored on the computer further includes a binary service tier.

4. The method as in claim 1, further including the step of receiving, at the first software stored on a computer, an identifier representative of the at least one functionality to be accessed from the second software.

5. The method as in claim 4, wherein the key and the identifier are received at the first software stored on a computer via an application programming interface.

6. The method as in claim 4, wherein the step of verifying the key includes:
generating a verification key based at least in part on the identifier;
comparing the key with the verification key using a computer; and
wherein the key is verified based on the comparison.

7. The method as in claim 6, wherein the key is verified when the key matches the verification key and the key is unverified when the key is different from the verification key.

8. The method as in claim 1, wherein the first software stored on a computer includes binary code.

9. The method as in claim 1, further comprising the steps of:
generating the key associated with the tier of functionality to be accessed; and
providing the key to a developer of the second software for use by the second software.

10. The method as in claim 1, wherein the key is generated based at least in part on an identifier representative of the at least one functionality to be accessed.

11. A computer readable medium for controlling access to at least one functionality of a first software, the computer readable medium comprising a set of instructions being adapted to manipulate a processor to:
receive, from a second software, a key associated with at least one functionality to be accessed of the first software;
verify the key; and
allow the second software to access the at least one functionality to be accessed within the first software when the key is verified, the at least one functionality to be accessed including a customer-added service tier.

12. The computer readable medium as in claim 11, further comprising the instructions to manipulate the processor to prohibit the second software from accessing the at least one functionality to be accessed of the first software when the key is unverified.

13. The computer readable medium as in claim 11, wherein the at least one functionality to be accessed further includes a binary service tier.

14. The computer readable medium as in claim 11, wherein the set of instructions further includes instructions adapted to manipulate the processor to receive an identifier associated with the at least one functionality to be accessed from the second software.

15. The computer readable medium as in claim 14, wherein the instructions adapted to manipulate the processor to verify the key include instructions to manipulate the processor to:
generate a verification key based at least in part on the identifier;
compare the key with the verification key; and
wherein the key is verified based on the comparison.

16. The computer readable medium as in claim 15, wherein the key is verified when the key matches the verification key and the key is unverified when the key is different from the verification key.

17. The computer readable medium as in claim 11, wherein the first software includes binary code.

18. The computer readable medium as in claim 11, wherein the set of instructions further comprise instructions to manipulate the processor to:
generate the key associated with the at least one functionality to be accessed; and
provide the key to a developer of the second software for use by the second software.

19. The computer readable medium as in claim 18, wherein the key is generated based at least in part on an identifier associated with the at least one functionality to be accessed.

20. A method for controlling access to a development service tier of a first software stored on a computer, the method comprising the steps of:
receiving, at the first software stored on a computer, a key associated with at least one development service tier within the first software stored on a computer, wherein the key is provided by a second software;
verifying the key using a computer; and
allowing, using the computer, the second software to access the at least one development service tier within the first software stored on a computer when the key is verified, the at least one development service tier within the first software stored on the computer including a customer-added service tier.

21. The method as in claim 20, further comprising the step of prohibiting the second software from accessing the at least one development service tier within the first software stored on the computer when the key is unverified.

22. The method as in claim 20, wherein the at least one development service tier within the first software stored on the computer further includes a binary service tier.

23. The method as in claim 20, further including the step of receiving, at the first software stored on a computer, an identifier representative of the at least one development service tier from the second software.

24. The method as in claim 23, wherein the key and the identifier are received at the first software stored on a computer via an application programming interface.

25. The method as in claim 23, wherein the step of verifying the key includes:
generating, using a computer, a verification key based at least in part on the identifier;
comparing the key with the verification key using a computer; and
wherein the key is verified based on the comparison.

26. The method as in claim 25, wherein the key is verified when the key matches the verification key and the key is unverified when the key is different from the verification key.

27. The method as in claim 20, wherein the first software stored on a computer includes binary code.

28. The method as in claim 20, further comprising the steps of:
generating, using the computer, the key associated with the at least one development service tier; and
providing the key to a developer of the second software for use by the second software.

29. The method as in claim 20, wherein the key is generated based at least in part on an identifier representative of the at least one development service tier.

* * * * *